(12) United States Patent
Nishimoto (10) Patent No.: US 9,450,679 B2
(45) Date of Patent: Sep. 20, 2016

(54) OPTICAL TRANSMITTER, OPTICAL RECEIVER AND OPTICAL TRANSCEIVER

(71) Applicant: Fujitsu Optical Components Limited, Kawasaki-shi, Kanagawa (JP)

(72) Inventor: Hiroshi Nishimoto, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 142 days.

(21) Appl. No.: 14/283,699

(22) Filed: May 21, 2014

(65) Prior Publication Data

US 2014/0362874 A1 Dec. 11, 2014

(30) Foreign Application Priority Data

Jun. 6, 2013 (JP) ................................. 2013-120244

(51) Int. Cl.
*H04J 3/04* (2006.01)
*H04B 10/61* (2013.01)
*H04B 10/40* (2013.01)

(52) U.S. Cl.
CPC ............ *H04B 10/616* (2013.01); *H04B 10/40* (2013.01)

(58) Field of Classification Search
CPC .. H04B 10/616; H04B 10/40; H04B 10/532; H04B 10/57; H04B 10/67; H04B 10/69
See application file for complete search history.

(56) References Cited

U.S. PATENT DOCUMENTS

| | | | | |
|---|---|---|---|---|
| 5,625,418 A * | 4/1997 | Binder | ..................... | H04N 7/54 348/464 |
| 5,870,668 A * | 2/1999 | Takano | .................. | H03D 7/168 455/126 |
| 7,058,966 B2 * | 6/2006 | BuAbbud | ........... | H04J 14/0226 348/E7.07 |
| 2002/0030870 A1 * | 3/2002 | Aburakawa | ...... | H04B 10/25753 398/115 |
| 2004/0005897 A1 * | 1/2004 | Tomoe | ................ | H04W 88/085 455/450 |
| 2004/0049606 A1 | 3/2004 | Nakagawa et al. | | |
| 2005/0280728 A1 | 12/2005 | Ishikawa et al. | | |
| 2007/0083909 A1 * | 4/2007 | Buabbud | ............. | H04J 14/0226 725/129 |
| 2010/0287449 A1 * | 11/2010 | Kubo | ..................... | H04J 3/1652 714/775 |
| 2011/0217040 A1 * | 9/2011 | Mori | ....................... | H04J 14/06 398/53 |
| 2013/0177306 A1 * | 7/2013 | Pfau | ..................... | H04B 10/616 398/9 |
| 2013/0259487 A1 * | 10/2013 | Sakamoto | .......... | H04B 10/6165 398/135 |
| 2016/0065312 A1 * | 3/2016 | Oyama | ................ | H04B 10/616 398/194 |

FOREIGN PATENT DOCUMENTS

| | | |
|---|---|---|
| JP | 2010-63173 | 3/2010 |
| WO | WO 97/14093 A1 | 4/1997 |

* cited by examiner

*Primary Examiner* — Kevin Mew
(74) *Attorney, Agent, or Firm* — Staas & Halsey LLP

(57) ABSTRACT

An optical receiver includes: an optical receiving device configured to generate an analog received signal that represents a received modulated optical signal; an A/D converter configured to generate a digital received signal from the analog received signal; an E/O circuit configured to generate an optical digital signal from the digital received signal; an O/E circuit configured to generate an electric digital signal from the optical digital signal; and a digital signal processor configured to recover a data signal from the electric digital signal.

12 Claims, 11 Drawing Sheets

Related Art

OPTICAL TRANSMITTER, OPTICAL RECEIVER AND OPTICAL TRANSCEIVER

CROSS-REFERENCE TO RELATED APPLICATION

This application is based upon and claims the benefit of priority of the prior Japanese Patent Application No. 2013-120244, filed on Jun. 6, 2013, the entire contents of which are incorporated herein by reference.

FIELD

The embodiments discussed herein are related to an optical transmitter, an optical receiver and an optical transceiver.

BACKGROUND

To increase the capacity of a data transmission, a transmission system that generates and/or recovers a signal by using a digital signal processing technique has been put into practical use in recent years. For example, in a backbone transmission system, a transmission system that provides 100 Gbps by using polarization-multiplexed multilevel modulation and digital coherent reception is in practical use.

Figure 1:
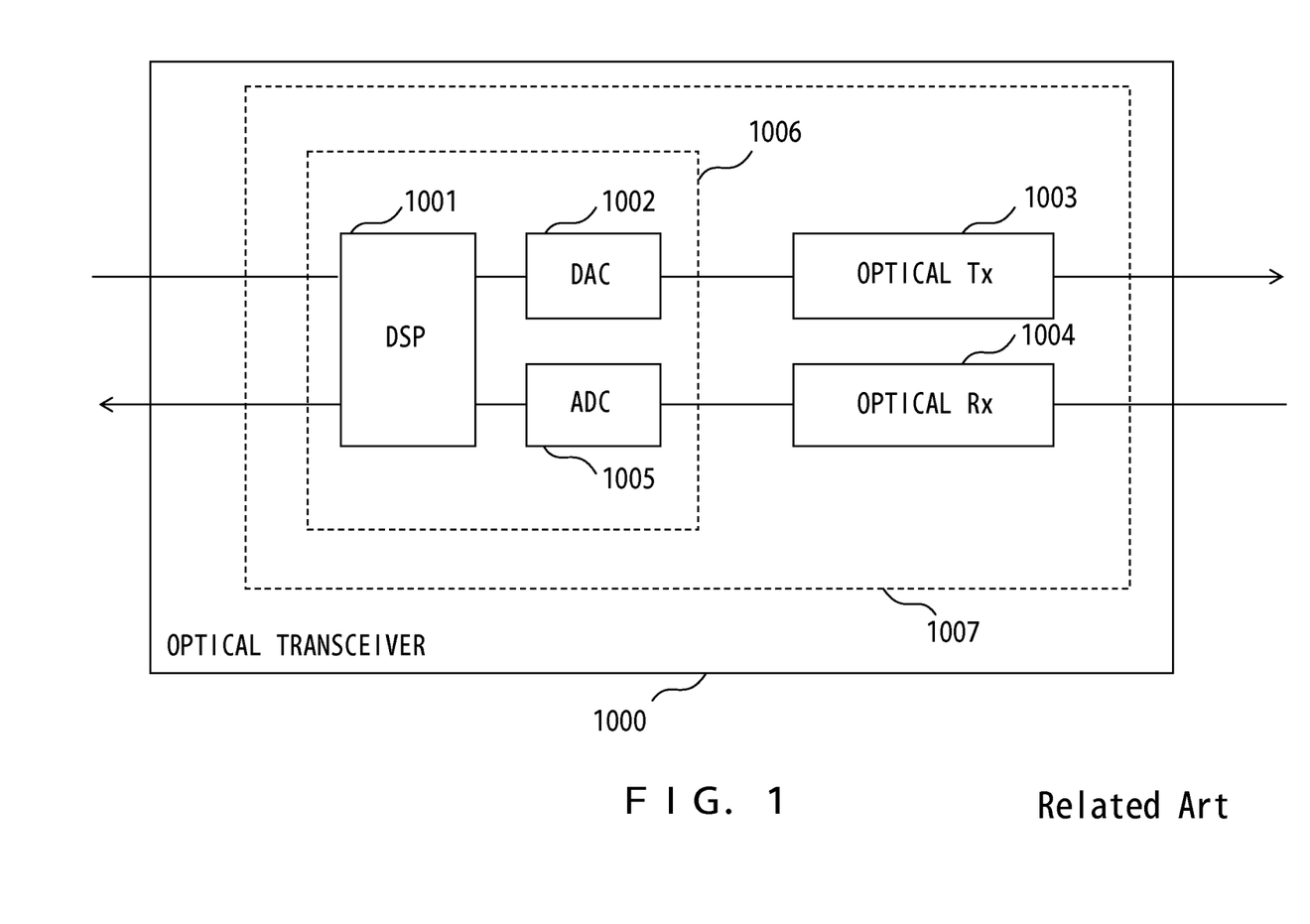
FIG. 1 illustrates an example of an optical transceiver.

FIG. 1 illustrates an example of an optical transceiver. The optical transceiver 1000 includes a digital signal processor (DSP) 1001, a D/A converter (DAC: Digital-to-Analog Converter) 1002, an optical transmitting device (Tx) 1003, an optical receiving device (Rx) 1004, and an A/D converter (ADC: Analog-to-Digital Converter) 1005 as illustrated in FIG. 1.

The DSP 1001 generates a transmission signal from an input data signal with digital signal processing. The D/A converter 1002 converts the transmission signal generated by the DSP 1001 into an analog signal. The optical transmitting device 1003 generates an optical signal based on an output signal of the D/A converter 1002. The optical receiving device 1004 generates a received signal that represents a received optical signal. The A/D converter 1005 converts the received signal into a digital signal. Then, the DSP 1001 recovers a data signal by demodulating an output signal of the A/D converter 1005 with digital signal processing.

The DSP 1001, the D/A converter 1002 and the A/D converter 1005 are mounted, for example, on one IC chip. In FIG. 1, the DSP 1001, the D/A converter 1002 and the A/D converter 1005 are mounted on a DSP-DAC/ADC chip 1006. Moreover, the DSP-DAC/ADC chip 1006, the optical transmitting device 1003 and the optical receiving device 1004 are mounted, for example, within one module. In FIG. 1, the DSP-DAC/ADC chip 1006, the optical transmitting device 1003 and the optical receiving device 1004 are mounted within an optical transceiver module 1007. In this case, the optical transceiver module 1007 is implemented, for example, on a motherboard.

Related techniques are described, for example, in International Publication Pamphlet No. WO97/14093 and Japanese laid-open Patent Publication No. 2010-63173.

In optical transmission equipment including an optical transceiver, it is sometimes demanded that optical devices (the optical transmitting device 1003 and the optical receiving device 1004 in FIG. 1) are removable. In the following description, a configuration in which a device is removable from the optical transmission equipment is sometimes referred to as being "pluggable".

Here, to realize a large-capacity optical transmission equipment, it is preferable that a size of a pluggable module is small in order to increase a mounting density of an optical transceiver. Accordingly, standards such as CFP2, CFP4 and the like are proposed to downsize a pluggable module.

Figure 2:
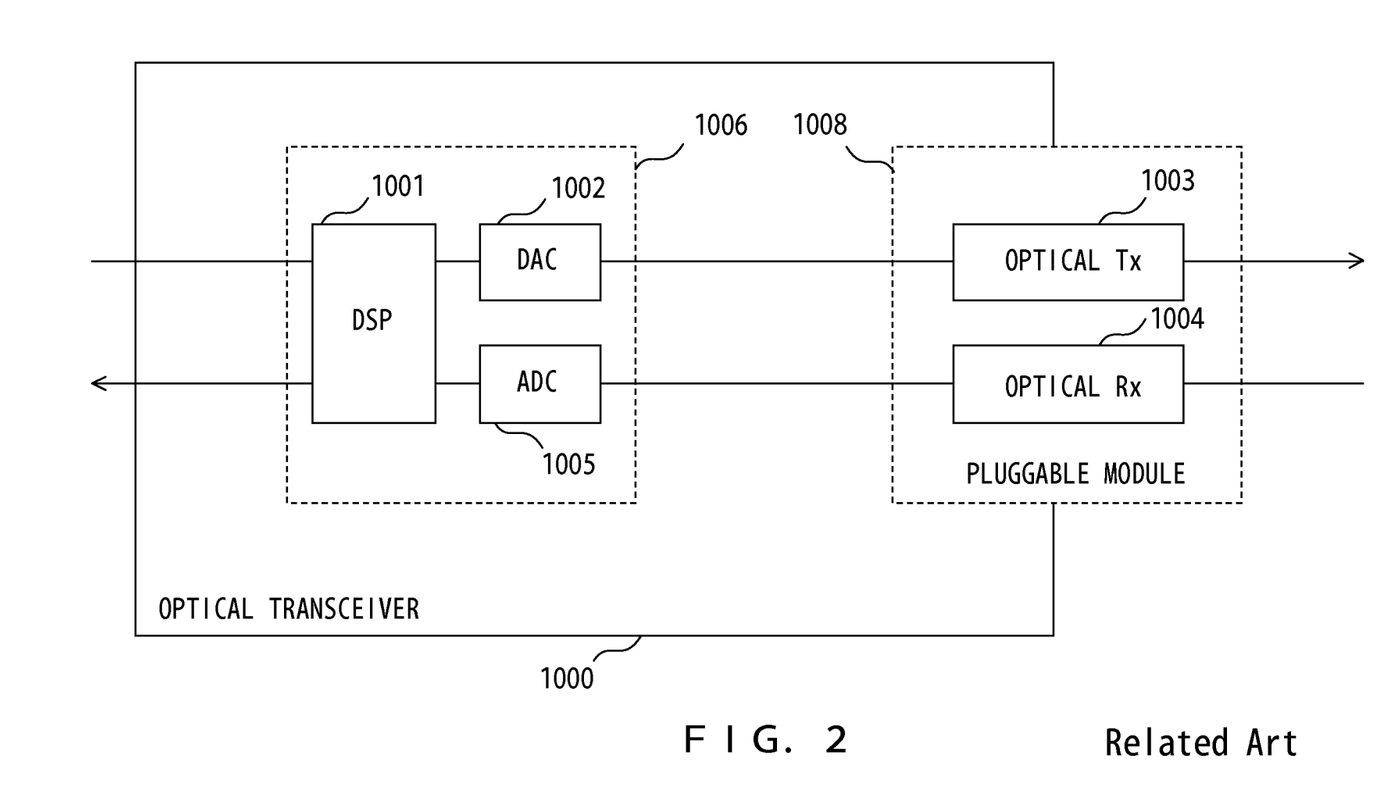
FIG. 2 illustrates problems of an optical transceiver using a pluggable module.

However, in the optical transceiver 1000 illustrated in FIG. 1, the DSP-DAC/ADC chip 1006 including the DSP 1001 consumes high power. Moreover, it is difficult to downsize the DSP-DAC/ADC chip 1006 in comparison with optical devices. For this reason, when a pluggable module including optical devices is downsized, it is difficult to implement the DSP-DAC/ADC chip 1006 within the pluggable module. Accordingly, in this case, the pluggable module 1008 and the DSP-DAC/ADC chip 1006 are separated and arranged on a motherboard as illustrated in FIG. 2. Namely, a signal line between the pluggable module 1008 and the DSP-DAC/ADC chip 1006 becomes long.

In the configuration illustrated in FIG. 2, an analog signal is transmitted between the pluggable module 1008 and the DSP-DAC/ADC chip 1006. When a bit rate or a symbol rate of a data signal is high, also a speed or a frequency of the analog signal transmitted between the pluggable module 1008 and the DSP-DAC/ADC chip 1006 becomes high. Moreover, it is difficult to shorten the signal line between the pluggable module 1008 and the DSP-DAC/ADC chip 1006 as described above. Accordingly, there is a probability that a waveform of the signal is degraded between the pluggable module 1008 and the DSP-DAC/ADC chip 1006. When the waveform of the analog signal is degraded, also transmission characteristics such as a bit error rate and the like are deteriorated.

The above described problems do not occur only in a case where optical devices are implemented within a pluggable module. Namely, in an optical transceiver using digital signal processing, transmission characteristics are sometimes degraded when the degree of freedom of an arrangement of optical devices and a DSP is improved. Moreover, the above described problems do not occur only in an optical transceiver including an optical transmitter and an optical receiver. Namely, the above described problems may also occur in an optical transmitter using digital signal processing, or an optical receiver using digital signal processing.

SUMMARY

According to an aspect of the embodiments, an optical receiver includes: an optical receiving device configured to generate an analog received signal that represents a received modulated optical signal; an A/D converter configured to generate a digital received signal from the analog received signal; an E/O circuit configured to generate an optical digital signal from the digital received signal; an O/E circuit configured to generate an electric digital signal from the optical digital signal; and a digital signal processor configured to recover a data signal from the electric digital signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 3A:
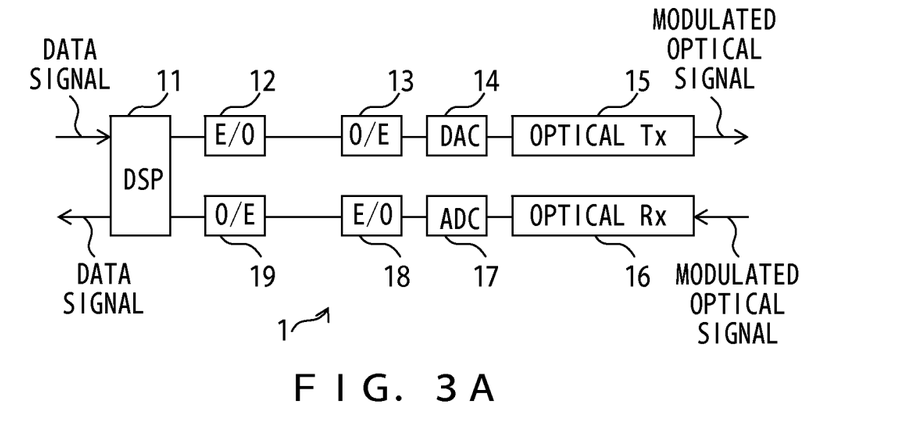
FIGS. 3A-3C illustrate configurations of an optical transceiver, an optical transmitter and an optical receiver according to an embodiment.
Figure 3B:
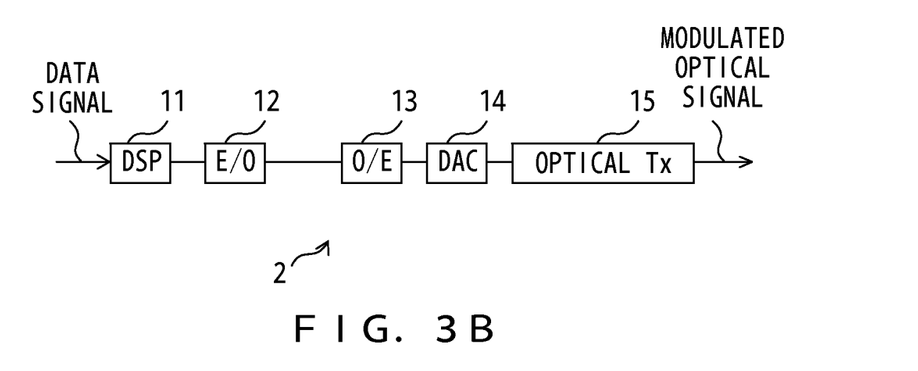
Figure 3C:
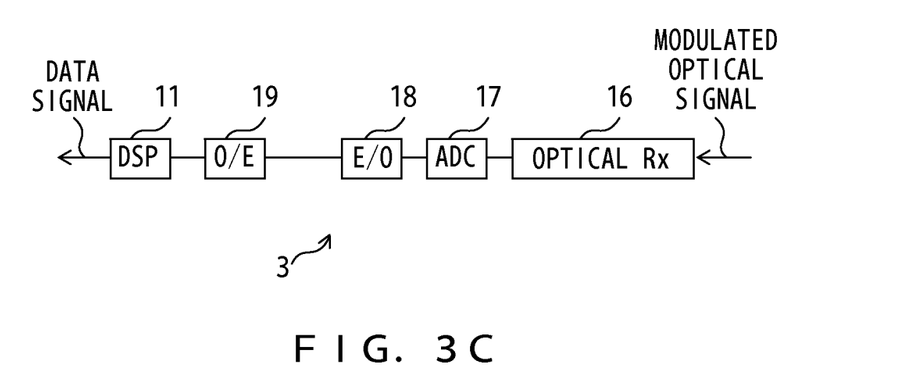

FIGS. 3A-3C illustrate configurations of an optical transceiver, an optical transmitter and an optical receiver according to an embodiment of the present invention. FIG. 3A illustrates an example of the configuration of the optical transceiver, FIG. 3B illustrates an example of the configuration of the optical transmitter, and FIG. 3C illustrates an example of the configuration of the optical receiver.

The optical transceiver 1 includes a digital signal processor (DSP) 11, an E/O (Electrical to Optical converter) circuit 12, an O/E (Optical to Electrical converter) circuit 13, a D/A converter (DAC) 14, an optical transmitting device (Tx) 15, an optical receiving device (Rx) 16, an A/D converter (ADC) 17, an E/O circuit 18, and an O/E circuit 19 as illustrated in FIG. 3A.

The DSP 11 generates a transmission signal from an input data signal with digital signal processing. At this time, the DSP 11 generates a transmission signal based on a specified modulation scheme and/or multiplexing scheme. For example, when polarization multiplexing QPSK is specified, the DSP 11 generates an X-polarization I-component signal, an X-polarization Q-component signal, a Y-polarization I-component signal and a Y-polarization Q-component signal as transmission signals. Moreover, the DSP 11 may perform, for the transmission signals, pre-equalization intended to suppress dispersion and/or nonlinear degradation of an optical fiber.

The E/O circuit 12 converts the transmission signal generated by the DSP 11 into an optical signal. This transmission signal is a digital signal generated by the DSP 11. Namely, the E/O circuit 12 generates an optical digital signal that represents the transmission signal. The optical digital signal generated by the E/O circuit 12 is guided to the O/E circuit 13 via an optical path. The optical path is implemented, for example, with an optical fiber or an optical waveguide. Alternatively, the optical path may be implemented with a combination of an optical fiber and an optical waveguide.

The O/E circuit 13 converts the optical digital signal generated by the E/O circuit 12 into an electric signal. Namely, the O/E circuit 13 generates an electric digital signal that represents the transmission signal. The D/A converter 14 converts the electric digital signal generated by the O/E circuit 13 into an analog signal. Namely, the D/A converter 14 generates an analog transmission signal that represents the transmission signal. The optical transmitting device 15 generates a modulated optical signal based on the analog transmission signal generated by the D/A converter 14.

The optical receiving device 16 receives a modulated optical signal from an optical network. Then, the optical receiving device 16 generates an analog received signal that represents the received modulated optical signal. The A/D converter 17 converts the analog received signal generated by the optical receiving device 16 into a digital signal. Namely, the A/D converter 17 generates a digital received signal that represents the received modulated optical signal. The E/O circuit 18 converts the digital received signal generated by the A/D converter 17 into an optical signal. Namely, the E/O circuit 18 generates an optical digital signal that represents the received modulated optical signal. The optical digital signal generated by the E/O circuit 18 is guided to the O/E circuit 19 via an optical path. The O/E circuit 19 converts the optical digital signal generated by the E/O circuit 18 into an electric signal. Namely, the O/E circuit 19 generates an electric digital signal that represents the received modulated optical signal.

The DSP 11 recovers a data signal from the electric digital signal generated by the O/E circuit 19. Namely, the DSP 11 demodulates the received modulated optical signal represented by the electric digital signal with digital signal processing. At this time, the DSP 11 may perform polarization demultiplexing, dispersion compensation, nonlinear degradation compensation, frequency offset compensation, phase recovery, symbol decision and the like.

In the optical transceiver 1 having the above described configuration, the D/A converter 14 and the optical transmitting device 15 are closely arranged. Namely, the D/A converter 14 and the optical transmitting device 15 may be provided within one module. In this case, the D/A converter 14 and the optical transmitting device 15 may be mounted or integrated on the same substrate. Accordingly, a transmission distance of an analog signal (between the D/A converter 14 and the optical transmitting device 15) is short.

A signal transmitted from the DSP 11 to the D/A converter 14 is a digital signal. Moreover, the E/O circuit 12 and the O/E circuit 13 are provided between the DSP 11 and the D/A converter 14, and an optical digital signal is transmitted from the E/O circuit 12 to the O/E circuit 13. Assume that the DSP 11 and the E/O circuit 12 are closely arranged, and the O/E circuit 13 and the D/A converter 14 are closely arranged. In this case, a degradation of a waveform of a signal transmitted from the DSP 11 to the D/A converter 14 is suppressed even though the DSP 11 and the D/A converter 14 are not closely arranged. Accordingly, even when a bit rate or a symbol rate of a data signal is high (for example, 100 Gbps or 25 Gsymbols/second), it becomes possible to increase a distance from the DSP 11 to the D/A converter 14 and the optical transmitting device 15.

Similarly, the optical receiving device 16 and the A/D converter 17 are closely arranged in the optical transceiver 1. Namely, the optical receiving device 16 and the A/D converter 17 may be provided within one module. In this case, the optical receiving device 16 and the A/D converter 17 may be mounted or integrated on the same substrate.

Accordingly, a transmission distance of an analog signal (between the optical receiving device 16 and the A/D converter 17) is short.

The signal transmitted from the A/D converter 17 to the DSP 11 is a digital signal. Moreover, the E/O circuit 18 and the O/E circuit 19 are provided between the A/D converter 17 and the DSP 11, and an optical digital signal is transmitted from the E/O circuit 18 to the O/E circuit 19. Assume that the DSP 11 and the O/E circuit 19 are closely arranged, and the E/O circuit 18 and the A/D converter 17 are closely arranged. In this case, a degradation of a waveform of a signal transmitted from the A/D converter 17 to the DSP 11 is suppressed even though the DSP 11 and the A/D converter 17 are not closely arranged. Accordingly, even when a bit rate or a symbol rate of a data signal is high, it becomes possible to increase a distance from the DSP 11 to the A/D converter 17 and the optical receiving device 16.

As described above, in the optical transceiver 1 according to the embodiment, it is possible to increase the distance from the DSP 11 to the optical transmitting device 15 and that from the DSP 11 to the optical receiving device 16. Accordingly, it is possible to flexibly design the optical transceiver using digital signal processing.

Note that the optical transceiver illustrated in FIG. 3A may be separated into a module having an optical transmitter function and a module having an optical receiver function. In this case, the optical transmitter 2 includes the DSP 11, the E/O circuit 12, the O/E circuit 13, the D/A converter 14 and the optical transmitting device 15 as illustrated in FIG. 3B. In addition, the optical receiver 3 includes the DSP 11, the optical receiving device 16, the A/D converter 17, the E/O circuit 18 and the O/E circuit 19 as illustrated in FIG. 3C.

<First Embodiment>

Figure 4:
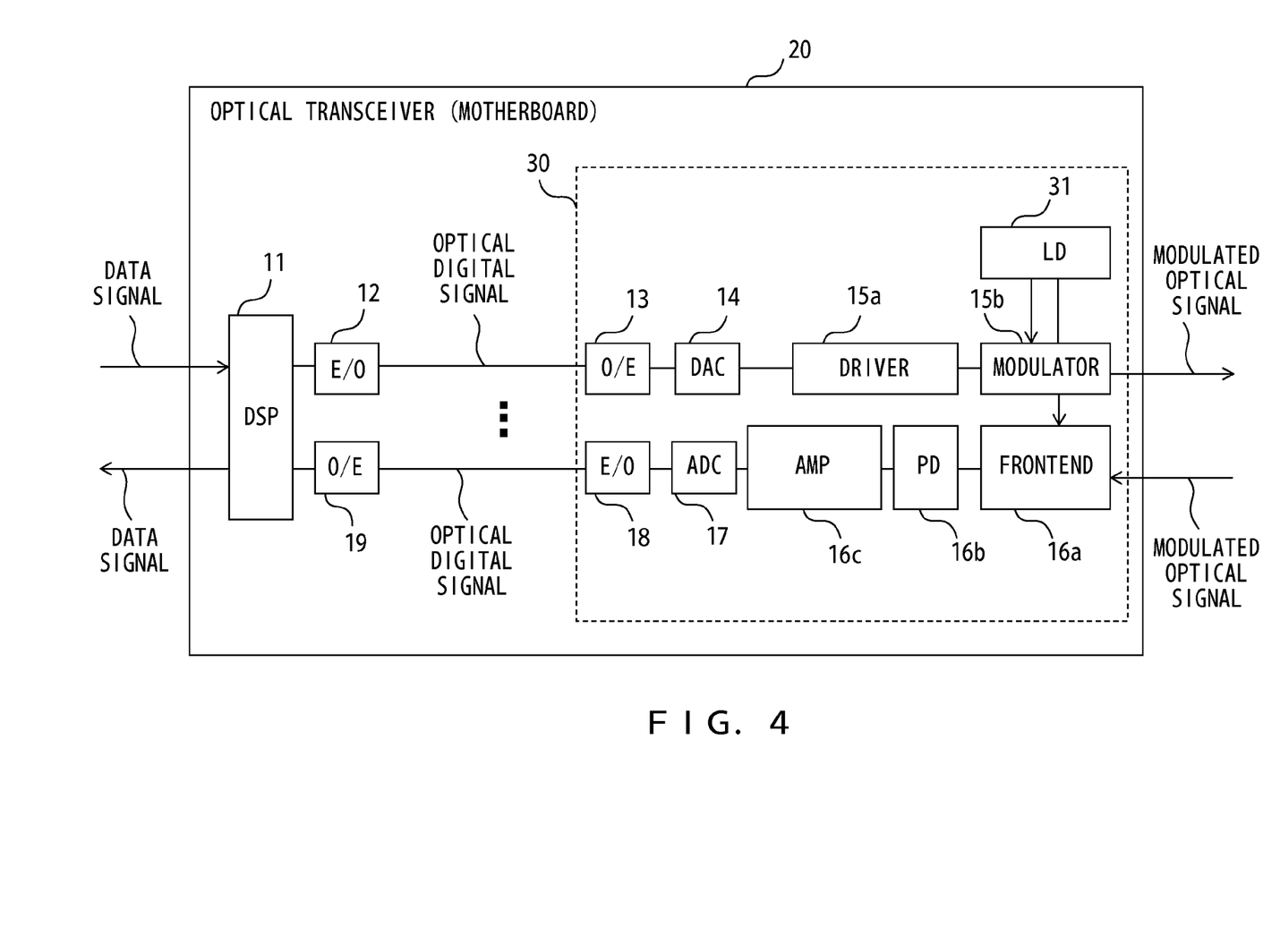
FIG. 4 illustrates a configuration of an optical transceiver according to a first embodiment.

FIG. 4 illustrates a configuration of an optical transceiver according to a first embodiment. The optical transceiver 20 according to the first embodiment includes the DSP 11, the E/O circuit 12, the O/E circuit 19, and a pluggable module 30 as illustrated in FIG. 4. Since the DSP 11, the E/O circuit 12 and the O/E circuit 19 are substantially the same in FIG. 3A and FIG. 4, explanations of these components are omitted.

The pluggable module 30 includes the O/E circuit 13, the D/A converter 14, a driver circuit 15a, a modulator 15b, a frontend circuit 16a, a photodetector (PD) 16b, an amplifier (AMP) 16c, the A/D converter 17, the E/O circuit 18, and a light source (LD) 31. The O/E circuit 13, the D/A converter 14, the driver circuit 15a, the modulator 15b, the frontend circuit 16a, the photodetector 16b, the amplifier 16c, the A/D converter 17, the E/O circuit 18 and the light source (LD) 31 may be implemented on one substrate. Note that since the O/E circuit 13, the D/A converter 14, the A/D converter 17 and the E/O circuit 18 are substantially the same in FIG. 3A and FIG. 4, explanations of these components are omitted.

The driver circuit 15a and the modulator 15b correspond to the optical transmitting device 15 illustrated in FIG. 3A. The driver circuit 15a generates a driving signal based on the analog transmission signal generated by the D/A converter 14. The modulator 15b generates a modulated optical signal by modulating continuous wave light generated by the light source 31 with the driving signal.

The frontend circuit 16a, the photodetector 16b and the amplifier 16c correspond to the optical receiving device 16 illustrated in FIG. 3A. The frontend circuit 16a is, for example, a 90-degree hybrid circuit including an interferometer. The frontend circuit 16a generates an I-component optical signal and a Q-component optical signal from a received modulated optical signal by using continuous wave light generated by the light source 31. When the received modulated optical signal is a polarization-multiplexed optical signal, the frontend circuit 16a may generate an I-component optical signal and a Q-component optical signal from the received modulated optical signal for each polarization. The photodetector 16b converts an optical signal output from the frontend circuit 16a into an electric signal. The amplifier 16c amplifies an output signal of the photodetector 16b.

The light source 31 includes a laser element, and generates continuous wave light having a specified wavelength. When a wavelength of the modulated optical signal generated by the optical transceiver 20 and that of a modulated optical signal received by the optical transceiver 20 are the same, the modulator 15b and the frontend circuit 16a may share one laser element.

The pluggable module 30 is configured to be removable from the motherboard of the optical transceiver 20 (here, the motherboard on which the DSP 11, the E/O circuit 12 and the O/E circuit 19 are implemented). Accordingly, for example, when the optical transceiver 20 is implemented in optical transmission equipment, the pluggable module 30 is removable from the optical transmission equipment. When the pluggable module 30 is implemented on the motherboard of the optical transceiver 20, the E/O circuit 12 and the O/E circuit 13 are optically coupled, and the O/E circuit 19 and the E/O circuit 18 are optically coupled.

Note that the D/A converter 14 and the A/D converter 17 may be mounted on one chip. In addition, the driver circuit 15a, the modulator 15b, the frontend circuit 16a, the photodetector 16b and the amplifier 16c may be integrated.

The E/O circuit 12 and the O/E circuit 19 may be implemented with an optical integrated circuit. Similarly, the O/E circuit 13 and the E/O circuit 18 may be implemented with an optical integrated circuit. In this case, an IC (an integrated circuit including the DSP 11, or the D/A converter 14 and the A/D converter 17) and an optical integrated circuit may be implemented within one package. Alternatively, an IC and an optical integrated circuit may be mounted (for example, flip chip assembly) with hybrid packaging. Further alternatively, an IC and an optical integrated circuit may be implemented with monolithic packaging.

As described above, in the optical transceiver 20 according to the first embodiment, the optical devices (the modulator 15b, the frontend circuit 16a and the like in FIG. 4), the D/A converter 14 and the A/D converter 17 are implemented in the pluggable module 30. However, a signal transmitted between the DSP 11 and the pluggable module 30 is an optical digital signal. Accordingly, a degradation of a waveform of the signal is suppressed in a transmission between the DSP 11 and the pluggable module 30 even though the DSP 11 and the pluggable module 30 are not closely arranged.

In the example illustrated in FIG. 4, the optical devices, the D/A converter 14 and the A/D converter 17 are implemented within the pluggable module 30. The present invention, however, is not limited to this configuration. Namely, the optical devices, the D/A converter 14 and the A/D converter 17 may be provided within a module fixed or secured on the motherboard of the optical transceiver 20.

In the optical transceiver 20, a bit rate of an optical digital signal transmitted between the DSP 11 and the optical device is higher than that of a data signal transmitted by the optical transceiver 20. Assume that a bit rate of data transmitted by the optical transceiver 20 is 100 Gbps. In addition, assume that a sampling rate of the A/D converter 17 is 2 bits/symbol and a resolution of the A/D converter 17 is 8 bits. In this case, a bit rate of the digital signal (namely, the signal transmitted from the A/D converter 17 to the DSP 11) that represents a received modulated optical signal is approximately 2Tbps. Similarly a bit rate of a digital signal (namely, the signal transmitted from the DSP 11 to the D/A converter 14) that represents a transmission signal is approximately 2 Tbps.

As describe above, digital signals transmitted within the optical transceiver 20 are very fast. Accordingly, these digital signals are transmitted, for example, in parallel as illustrated in FIG. 5.

Figure 5:
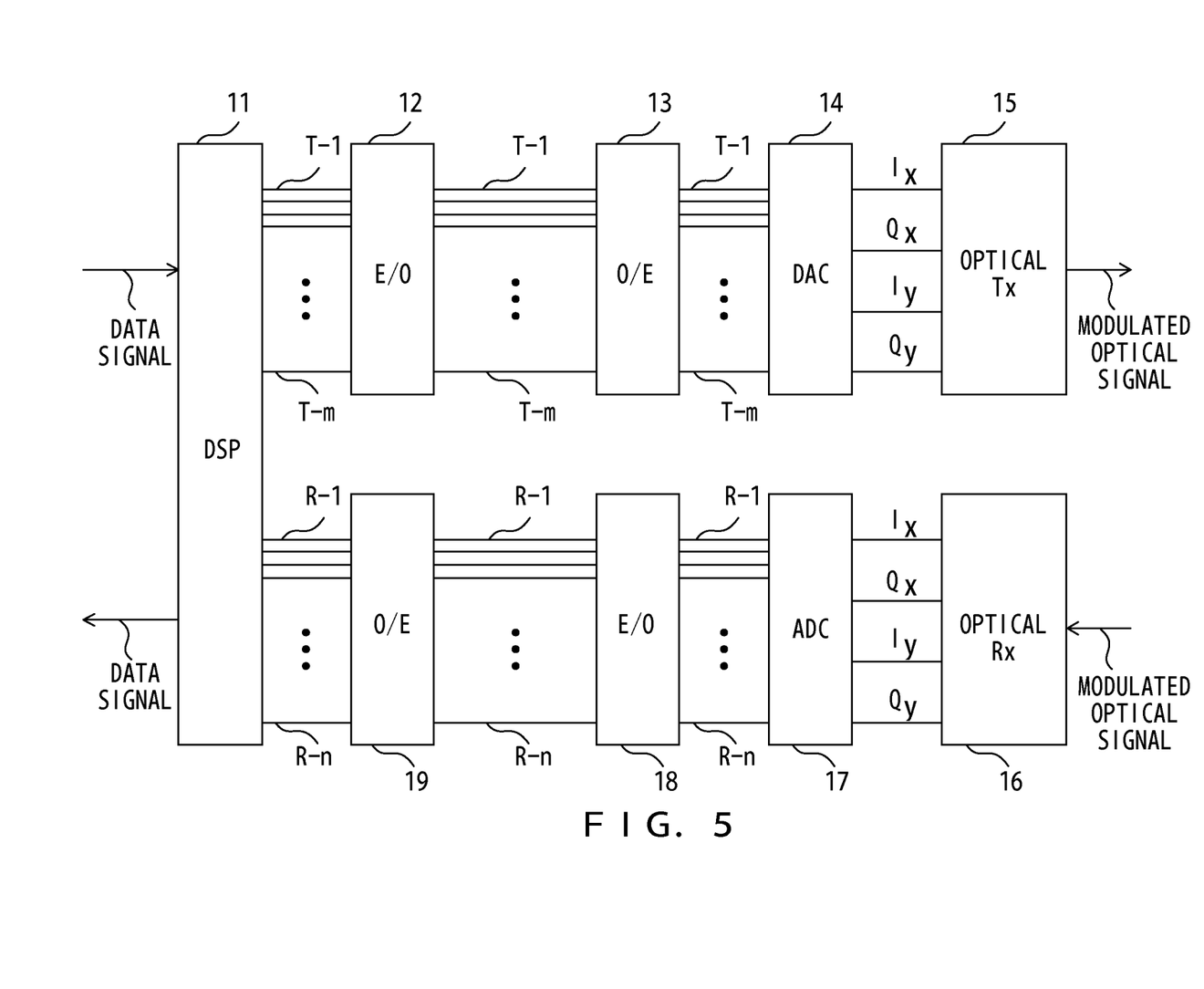
FIG. 5 illustrates a parallel transmission of optical digital signals.

In the example illustrated in FIG. 5, the optical transceiver 20 transmits a DP-QPSK modulated optical signal. In this case, a received modulated optical signal is represented with an X-polarization I-component signal (Ix), an X-polarization Q-component signal (Qx), a Y-polarization I-component signal (Iy) and a Y-polarization Q-component signal (Qy) by the optical transmitting device 15. The X-polarization I-component signal, the X-polarization Q-component signal, the Y-polarization I-component signal and the Y-polarization Q-component signal are respectively represented with a plurality of digital signals by the A/D converter 17. Namely, the received modulated optical signal is represented with digital signals R-1 to R-n, and transmitted in parallel from the A/D converter 17 to the DSP 11. Then, the DSP 11 recovers a received data based on the digital signals R-1 to R-n.

Here, assume that a bit rate of transmission data is 100 Gbps. In addition, assume that the sampling rate of the A/D converter 17 is 2 bits/symbol, and the resolution of the A/D converter 17 is 8 bits. In this case, the X-polarization I-component signal, the X-polarization Q-component signal, the Y-polarization I-component signal and the Y-polarization Q-component signal are respectively represented, for example, with 16 digital signals. Therefore, the received modulated optical signal is represented with 64 digital signals R-1 to R-64.

On the other hand, the DSP 11 represents a transmission data with digital signals T-1 to T-m. Here, the digital signals T-1 to T-m include a digital signal that represents an X-polarization I-component signal, a digital signal that represents an X-polarization Q-component signal, a digital signal that represents a Y-polarization I-component signal, and a digital signal that represents a Y-polarization Q-component signal. The digital signals T-1 to T-m are transmitted in parallel from the DSP 11 to the D/A converter 14. Then, the D/A converter 14 generates the X-polarization I-component signal, the X-polarization Q-component signal, the Y-polarization I-component signal and the Y-polarization Q-component signal from the digital signals T-1 to T-m, and the optical transmitting device 15 generates a modulated optical signal from these signals. The number (namely, m) of digital signals that represent transmission data may be the same as or different from the number (namely, n) of digital signals that represent a received modulated optical signal.

As described above, in the optical transceiver 20, a received modulated optical signal is represented with a plurality of digital signals, which are transmitted in parallel. Similarly, transmission data is represented with a plurality of digital signals, which are transmitted in parallel. Here, if these digital signals are transmitted as electric signals, the signals may possibly be degraded by a crosstalk. Moreover, a termination resistor for impedance matching is needed, leading to an increase in power consumption. In contrast, digital signals are transmitted as optical signals in the optical transceiver 20. Therefore, these problems can be avoided or suppressed.

Note that, when the number of optical digital signals transmitted in parallel is large, it possibly becomes difficult to downsize the optical transceiver 20. Accordingly, the number of optical signals transmitted in parallel within the optical transceiver 20 may be decreased by using multiplexing and/or multilevel modulation.

Figure 6:
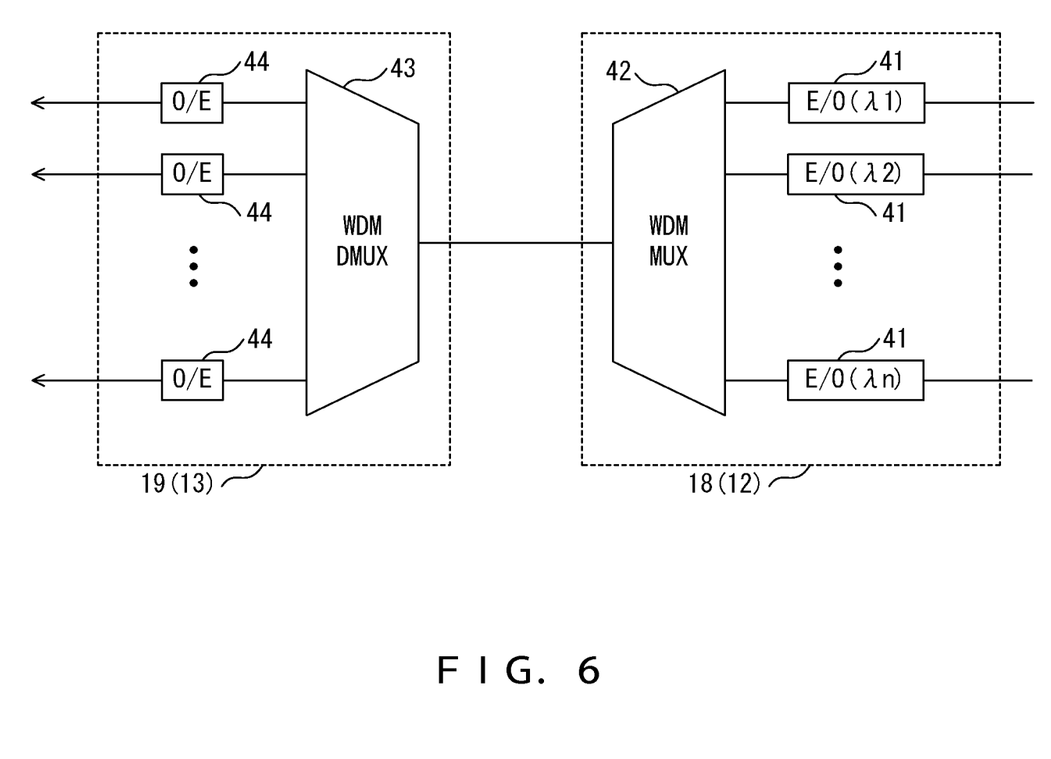
FIG. 6 illustrates a configuration for transmitting optical digital signals with wavelength division multiplexing.

FIG. 6 illustrates a configuration for transmitting a plurality of optical digital signals with wavelength division multiplexing (WDM). Here, the configuration for transmitting the plurality of digital signals from the E/O circuit 18 to the O/E circuit 19 is illustrated. Assume that a plurality of digital signals generated by the A/D converter 17 are given to the E/O circuit 18 in parallel.

The E/O circuit 18 includes a plurality of E/O elements 41 and a WDM multiplexer 42. Each of the plurality of E/O elements 41 includes a light source for generating continuous wave light having a different wavelength ($\lambda$d-$\lambda$n). Moreover, to each of the E/O elements 41, a corresponding digital signal is given. Each of the E/O elements 41 generates a corresponding optical digital signal by driving the light source with the given digital signal. The WDM multiplexer 42 multiplexes optical digital signals generated by the plurality of E/O elements 41. The WDM optical signal generated by the E/O circuit 18 is guided to the O/E circuit 19, for example, via an optical fiber.

The O/E circuit 19 includes a WDM demultiplexer 43 and a plurality of O/E elements 44. The WDM demultiplexer 43 demultiplexes the WDM optical signal received from the E/O circuit 18 with respect to wavelength. Namely, the WDM optical signal is demultiplexed into a plurality of optical digital signals. Each of the O/E elements 44 converts a corresponding optical digital signal obtained by the WDM demultiplexer 43 into an electric signal.

As described above, in the configuration illustrated in FIG. 6, a plurality of optical digital signals are multiplexed into a WDM optical signal and transmitted. Accordingly, the number of optical paths (such as optical fibers) for transmitting optical digital signals from the E/O circuit 18 to the O/E circuit 19 can be reduced. For example, it is possible to multiplex 64 wavelengths into one WDM optical signal with an existing technique. Accordingly, using this technique enables optical digital signals from the E/O circuits 18 to the O/E circuits 19 to be transmitted with one optical fiber.

Figure 7:
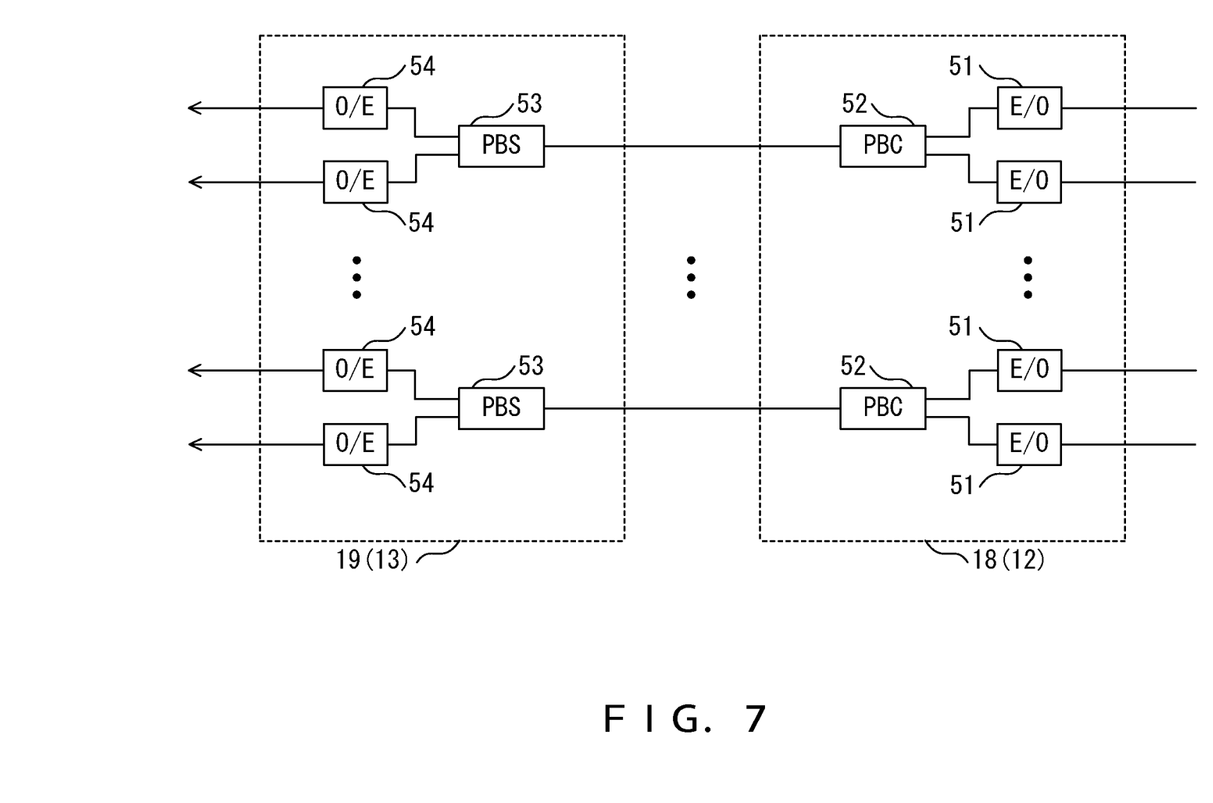
FIG. 7 illustrates a configuration for transmitting optical digital signals with polarization multiplexing.

FIG. 7 illustrates a configuration for transmitting a plurality of optical digital signals with polarization multiplexing. In this case, the E/O circuit 18 includes a plurality of E/O elements 51 and a plurality of polarization beam combiners (PBCs) 52. To each of the E/O elements 51, a corresponding digital signal is given. Namely, each of the E/O elements 51 converts the corresponding digital signal into an optical digital signal. Each of the polarization beam combiners 52 generates a polarization-multiplexed optical signal by multiplexing one pair of optical digital signals generated by corresponding pair of E/O elements 51. A plurality of polarization-multiplexed optical signals generated by the E/O circuits 18 are guided to the O/E circuit 19 respectively via optical paths. In this case, the optical paths are implemented, for example, with polarization maintaining fibers or polarization maintaining optical lines.

The O/E circuit 19 includes a plurality of polarization beam splitters (PBSs) 53, and a plurality of O/E elements 54. Each of the polarization beam splitters 53 splits a corresponding polarization-multiplexed optical signal into one pair of optical digital signals, and guides the signals to corresponding pair of O/E elements 54. Each of the O/E elements 54 converts the optical digital signal given from the corresponding polarization beam splitter 53 into an electric signal.

As described above, in the configuration illustrated in FIG. 7, two digital signals are transmitted via one optical path (such as an optical fiber) with polarization multiplexing. Accordingly, the number of optical paths for transmitting optical digital signals from the E/O circuit 18 to the O/E circuit 19 is reduced to one half in comparison with the configuration illustrated in FIG. 5.

Figure 8:
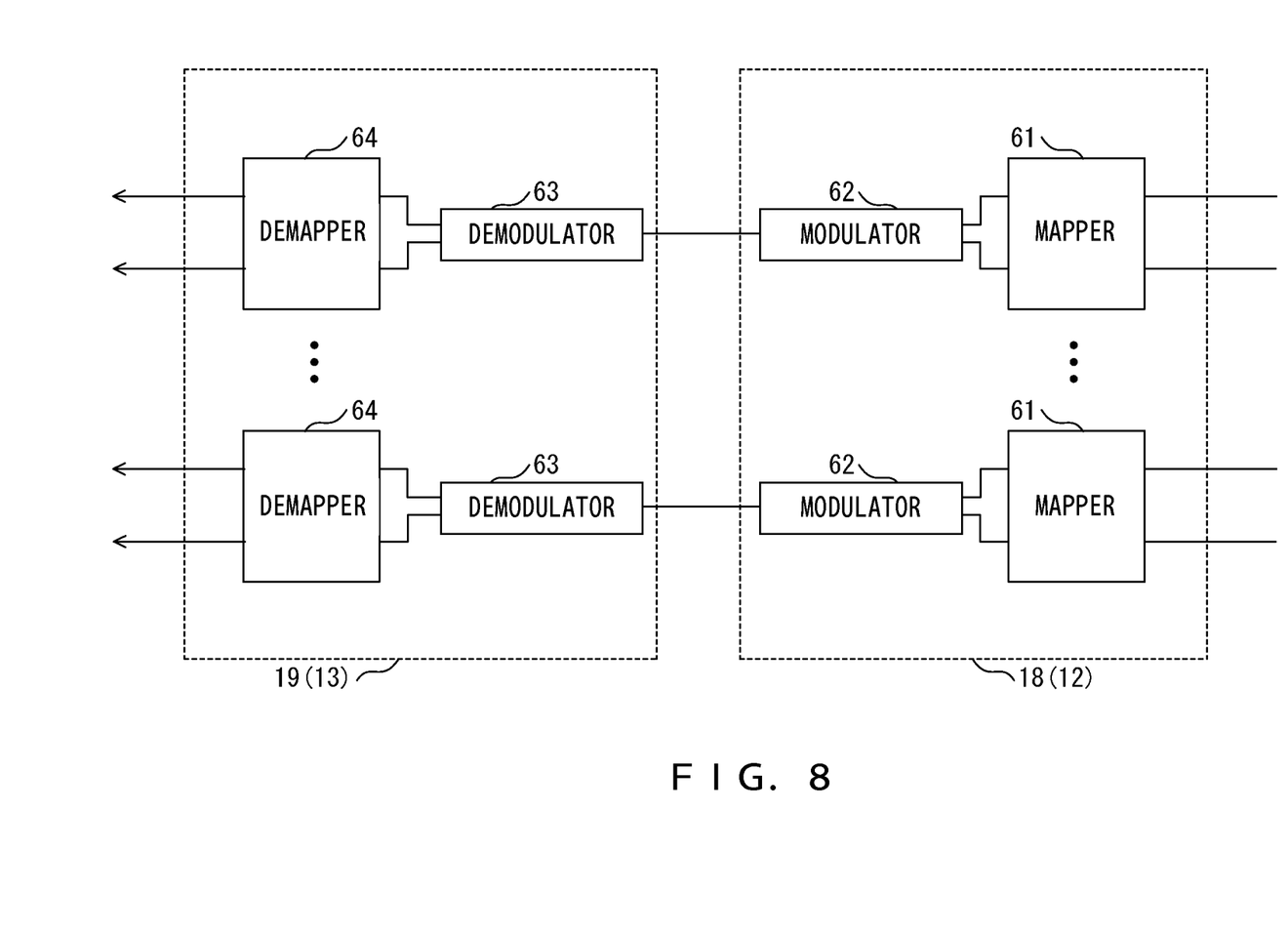
FIG. 8 illustrates a configuration for transmitting optical digital signals with multilevel modulation.

FIG. 8 illustrates a configuration for transmitting a plurality of optical digital signals with multilevel modulation. In this case, the E/O circuit 18 includes a plurality of mappers 61, and a plurality of modulators 62. To each of the mappers 61, digital signals are given in parallel. The number of digital signals given in parallel to the mapper 61 corresponds to a specified modulation scheme. For example, two digital signals are given when QPSK is specified, and four digital signals are given when 16QAM is specified. Each of the mappers 61 generates a symbol sequence from the plurality of given digital signals based on the specified modulation scheme. Each symbol is represented with one pair of values (I component and Q component). Each of the modulators 62 generates a multilevel modulated optical signal based on the symbol sequence given from a corresponding mapper 61. A plurality of multilevel modulated optical signals generated by the E/O circuit 18 are guided to the O/E circuit 19, for example, respectively via optical fibers.

The O/E circuit 19 includes a plurality of demodulators 63, and a plurality of demappers 64. Each of the demodulators 63 generates demodulated signals (an I-component signal and a Q-component signal) by demodulating a corresponding multilevel modulated optical signal. Each of the demappers 64 regenerates digital signals by demapping corresponding demodulated signals.

As described above, in the configuration illustrated in FIG. 8, a plurality of digital signals are transmitted via one optical path (such as an optical fiber) with multilevel modulation. Accordingly, the number of optical paths for transmitting optical digital signals from the E/O circuit 18 to the O/E circuit 19 is reduced according to a specified modulation scheme in comparison with the configuration illustrated in FIG. 5. For example, the number of optical paths is reduced to one half when QPSK is specified, and the number of optical paths is reduced to a quarter when 16QAM is specified.

FIGS. 6-8 refer to the receiver circuits (the configuration for transmitting optical digital signals from the E/O circuit 18 to the O/E circuit 19). A similar configuration is applicable also to the transmitter circuit (the configuration for transmitting optical digital signals from the E/O circuit 12 to the O/E circuit 13). Moreover, the configurations illustrated in FIGS. 6-8 may be arbitrarily combined. For example, if the configurations illustrated in FIGS. 6 and 7 are combined, a polarization-multiplexed optical signal is transmitted for each wavelength. Additionally, if the configurations illustrated in FIGS. 6 and 8 are combined, a multilevel modulated optical signal is transmitted for each wavelength. Furthermore, if the configurations illustrated in FIGS. 6-8 are combined, a polarization-multiplexed multilevel modulated optical signal is transmitted for each wavelength.

Note that a configuration for reducing the number of optical paths within the optical transceiver is not limited to the examples illustrated in FIGS. 6-8. For instance, the number of optical paths may be reduced by using DMT (Digital Multi Tone). Alternatively, the number of optical paths may be reduced by multiplexing digital QAM electric signals with multi-carrier light.

As described above, a signal transmitted between the DSP 11 and the optical device (the optical transmitting device 15 or the optical receiving device 16) is converted into an optical digital signal in the first embodiment. Therefore, according to the first embodiment, the following effects may be produced in comparison with a configuration that does not employ the configuration of the first embodiment (such as the configuration illustrated in FIG. 2).

In the optical transceiver illustrated in FIG. 2, a signal transmitted between the DSP 1001 and the optical device (the optical transmitting device 1003 or the optical receiving device 1004) is an analog electric signal. Accordingly, a waveform of the signal is degraded in a transmission between the DSP 1001 and the optical device. Moreover, when the optical device is implemented in the pluggable module 1008, a capacitive component is present in an interface between the motherboard and the pluggable module 1008. Therefore, the waveform of the analog electric signal may possibly be degraded by the capacitive component. Moreover, there is a need to perform impedance matching with the analog electric signal in the interface between the motherboard and the pluggable module 1008. Accordingly, an electric current flows into a termination resistor for impedance matching, leading to an increase in power consumption.

In the meantime, in the optical transceiver 20 according to the first embodiment, a signal transmitted between the DSP 11 and the optical device (the optical transmitting device 15 or the optical receiving device 16) is an optical digital signal. Accordingly, a degradation of a waveform of the signal is suppressed in a transmission between the DSP 11 and the optical device. Moreover, when the optical device is implemented in the pluggable module 30, the motherboard and the pluggable module 30 are coupled in an optical domain. Accordingly, a capacitive component is substantially zero in the interface between the motherboard and the pluggable module 30. Additionally, the termination resistor for impedance matching is not needed in the interface between the motherboard and the pluggable module 30, leading to a reduction in power consumption.

In the first embodiment, an analog electric signal is transmitted within the pluggable module 30. However, since a distance over which the analog electric signal is transmitted is sufficiently short in comparison with the configuration illustrated in FIG. 2, a degradation of a waveform of the signal is suppressed. Especially, if the O/E circuit 13 and the E/O circuit 18 are integrated with other circuit elements in the pluggable module 30, a capacitive component of a transmission path may be very small. As a result, the degradation of the waveform is further suppressed.

<Second Embodiment>

Figure 9:
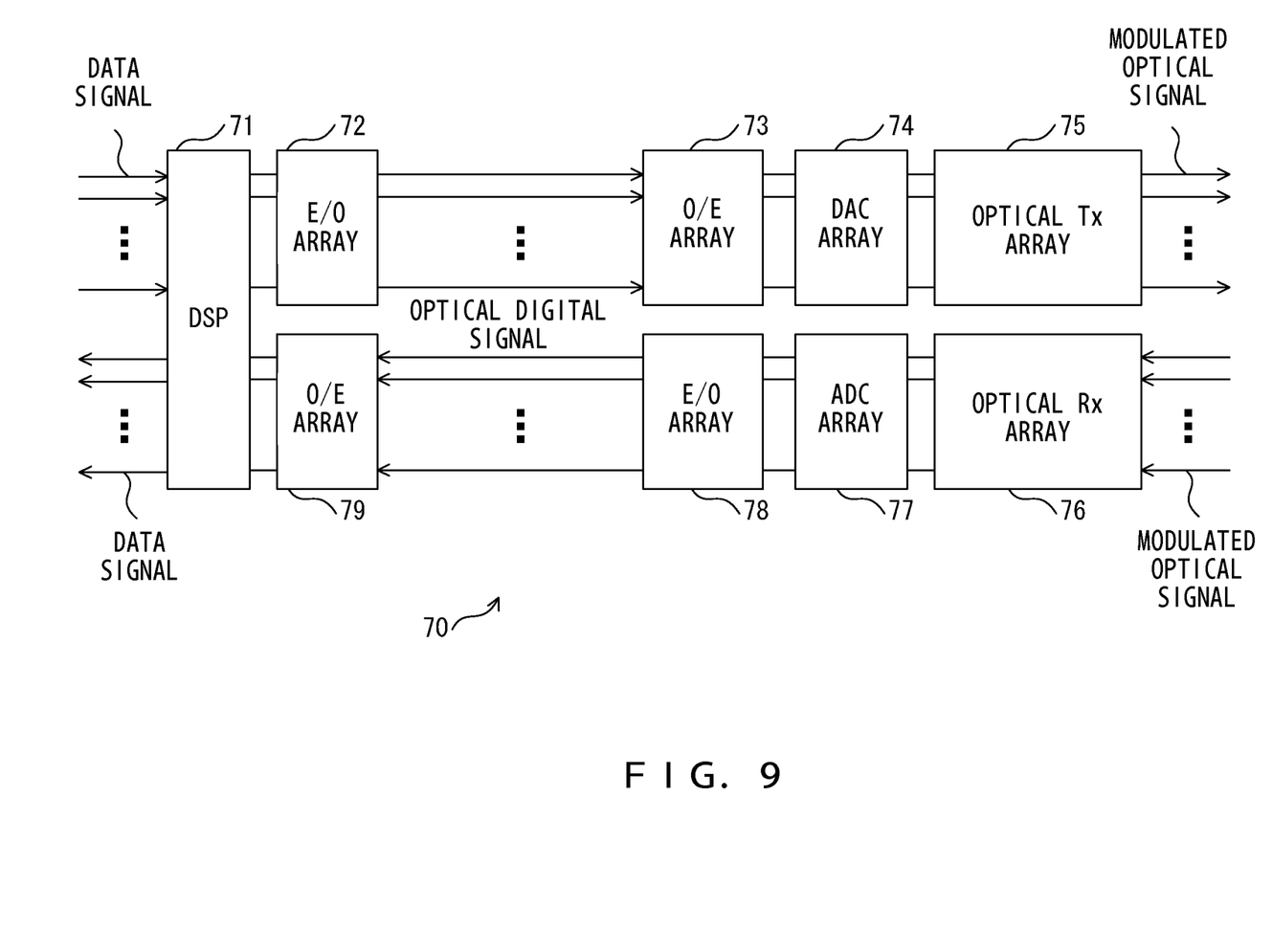
FIG. 9 illustrates a configuration of an optical transceiver according to a second embodiment.

FIG. 9 illustrates a configuration of an optical transceiver according to a second embodiment. The optical transceiver 70 according to the second embodiment accommodates a plurality of optical channels as illustrated in FIG. 9. The plurality of optical channels are implemented, for example, with WDM. In this case, a received WDM optical signal may be demultiplexed with respect to wavelength, and the plurality of optical signals may be fed to the optical transceiver 70. Moreover, a plurality of optical signals generated by the optical transceiver 70 may be multiplexed into a WDM optical signal, and output to an optical network.

A DSP 71 may generate a plurality of transmission signals, and may recover a plurality of received data signals.

Each of the transmission signals represents a transmission data signal transmitted via a corresponding optical channel. Each of the received data signals is recovered from a corresponding received optical signal. An E/O circuit array 72 includes a plurality of E/O circuits 12. An O/E circuit array 73 includes a plurality of O/E circuits 13. A D/A conversion circuit array 74 includes a plurality of D/A converters 14. An optical transmitting device array 75 includes a plurality of optical transmitting devices 15. An optical receiving device array 76 includes a plurality of optical receiving devices 16. An A/D conversion circuit array 77 includes a plurality of A/D converters 17. An E/O circuit array 78 includes a plurality of E/O circuits 18. An O/E circuit array 79 includes a plurality of O/E circuits 19.

The optical transmitting device array 75 may be implemented, for example, by integrating a plurality of optical transmitting devices 15 on one substrate. Similarly, the optical receiving device array 76 may be implemented, for example, by integrating a plurality of optical receiving devices 16 on one substrate. Moreover, the optical transmitting device array 75 and the optical receiving device array 76 may be packaged in one module.

In recent years, it has become possible to integrate electronic circuit elements and optical elements with high density, for example, by using a silicon photonics technique. Accordingly, downsizing a module in which a plurality of optical transmitting devices 15 and/or a plurality of optical receiving devices 16 are packaged may be requested in the future.

However, if the number of optical transmitting devices 15 and/or optical receiving devices 16, which are packaged within one optical circuit module, increases, also the number of transmission lines connecting between the optical circuit module and the DSP 71 increases. Accordingly, when the number of optical transmitting devices 15 and/or optical receiving devices 16 increases, it becomes more difficult to shorten a distance between the optical circuit module and the DSP 71. Therefore, in the configuration where a signal transmitted between the optical circuit module and the DSP 71 is an analog electric signal, a degradation of a waveform of the signal is increasingly significant as the number of optical transmitting devices 15 and/or optical receiving devices 16, which are packaged in the optical circuit module, increases. For this reason, the configuration according to the embodiment of the present invention provides a great advantage when the number of optical transmitting devices 15 and/or optical receiving devices 16, which are packaged in the optical circuit module, is large.

<Optical Transmission Equipment>

As described above, there is no need to arrange a DSP, which is used to generate a transmission signal and/or to recover a data signal, closely to an optical circuit (an optical transmitting device, an optical receiving device and the like) in the optical transceiver according to the embodiment of the present invention. Namely, the degree of freedom of an arrangement of a DSP with respect to an optical circuit is high. Accordingly, it is possible to arrange a DSP at a desired position, for example, in the optical transmission equipment.

Figure 10:
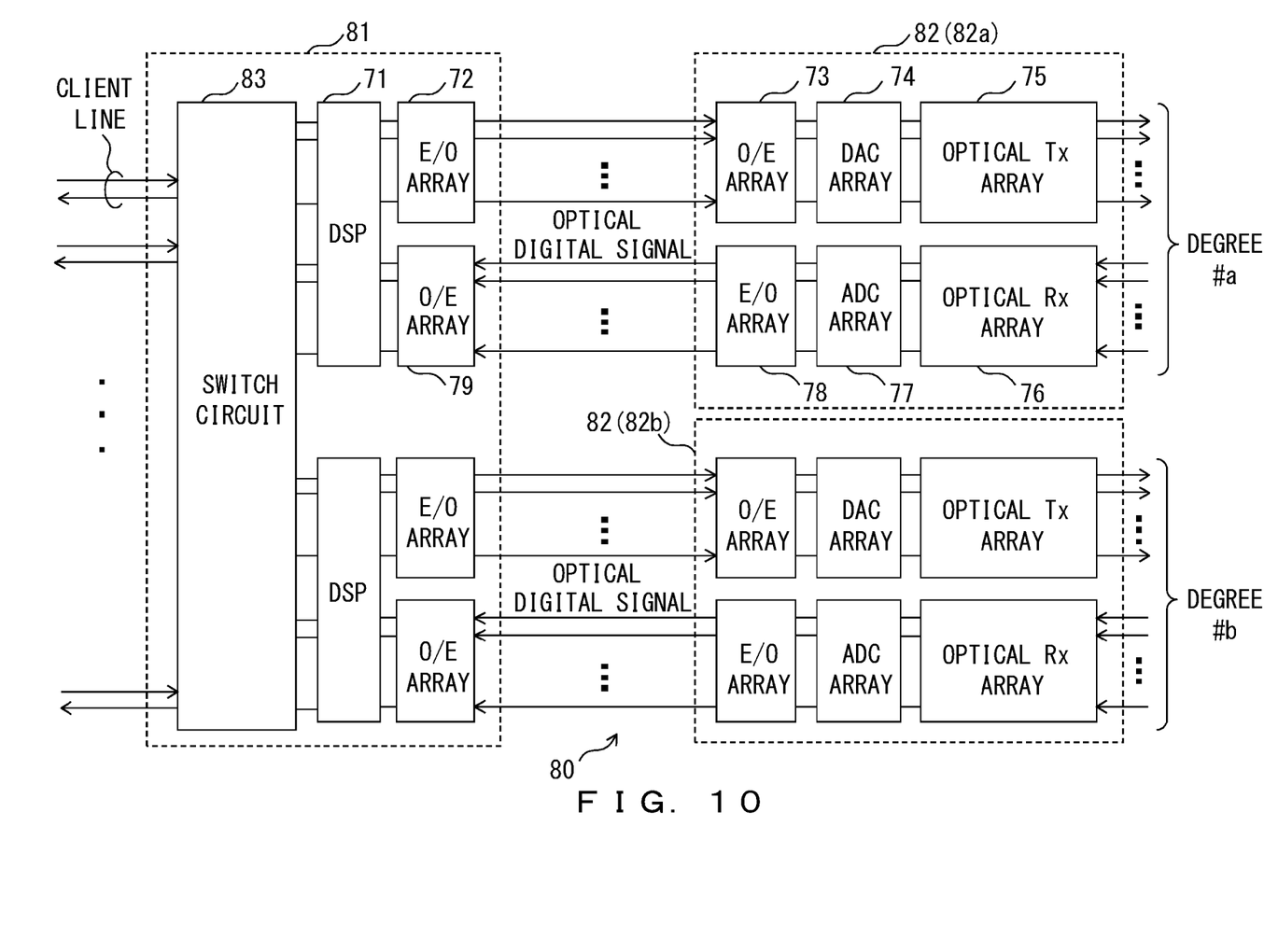
FIG. 10 illustrates an example of optical transmission equipment according to an embodiment.

FIG. 10 illustrates an example of the optical transmission equipment according to an embodiment of the present invention. The optical transmission equipment 80 according to this embodiment includes a switch module 81 and an optical transceiver module 82 as illustrated in FIG. 10. In this example, two optical transceiver modules 82 (82a, 82b) are implemented in the optical transmission equipment 80. Note that the optical transmission equipment 80 includes the optical transceiver modules 82 (82a, 82b), byway of example, for each of degrees (#a, #b) of the optical transmission equipment 80.

The switch module 81 includes a switch circuit 83, the DSP 71, the E/O circuit array 72 and the O/E circuit array 79. In the example illustrated in FIG. 10, one set of the DSP 71, the E/O circuit array 72 and the O/E circuit array 79 is provided for each of the optical transceiver modules 82.

The switch circuit 83 accommodates a plurality of client lines. Each of the client lines includes an uplink line for transmitting a signal from a corresponding client to the optical transmission equipment 80, and a downlink line for transmitting a signal from the optical transmission equipment 80 to the client. Moreover, the switch circuit 83 may guide a client signal received via a client line to an optical transmission line designated by route information. For example, when the client signal is transmitted to the degree #a, the switch circuit 83 guides the client signal to the DSP 71 corresponding to the optical transceiver module 82a so that the client signal will be guided to the optical transceiver module 82a. Moreover, the switch circuit 83 may guide a client signal received via an optical transmission line to a client line designated by route information. Additionally, the switch circuit 83 may guide a client signal received via a certain optical transmission line to another optical transmission line according to given route information. Note that the route information is given, for example, from a network management system not illustrated.

The DSP 71, the E/O circuit array 72 and the O/E circuit array 79 are substantially the same as, for example, the corresponding circuit elements of the optical transceiver 70 illustrated in FIG. 9. Namely, the DSP 71 may generate a transmission signal based on a client signal. The E/O circuit array 72 transmits, to the O/E circuit array 73, optical digital signals that represent corresponding transmission signal. The O/E circuit array 79 receives, from the E/O circuit array 78, optical digital signals that represent corresponding modulated optical signal. The DSP 71 may recover a client signal from output signals of the O/E circuit array 79, and may guide the signal to the switch circuit 83.

The optical transceiver module 82 includes the O/E circuit array 73, the D/A conversion circuit array 74, the optical transmitting device array 75, the optical receiving device array 76, the A/D conversion circuit array 77 and the E/O circuit array 78. The O/E circuit array 73, the D/A conversion circuit array 74, the optical transmitting device array 75, the optical receiving device array 76, the A/D conversion circuit array 77 and the E/O circuit array 78 are substantially the same as, for example, the corresponding circuit elements of the optical transceiver 70 illustrated in FIG. 9.

In the optical transmission equipment 80, there is no need to arrange the DSP 71 closely to the optical circuit (the optical transmitting device array 75 and/or the optical receiving device array 76). Namely, the DSP 71 may be arranged at a desired position within the optical transmission equipment 80. In the example illustrated in FIG. 10, the DSP 71 is implemented in the switch module 81 that provides a switching function.

Figure 11:
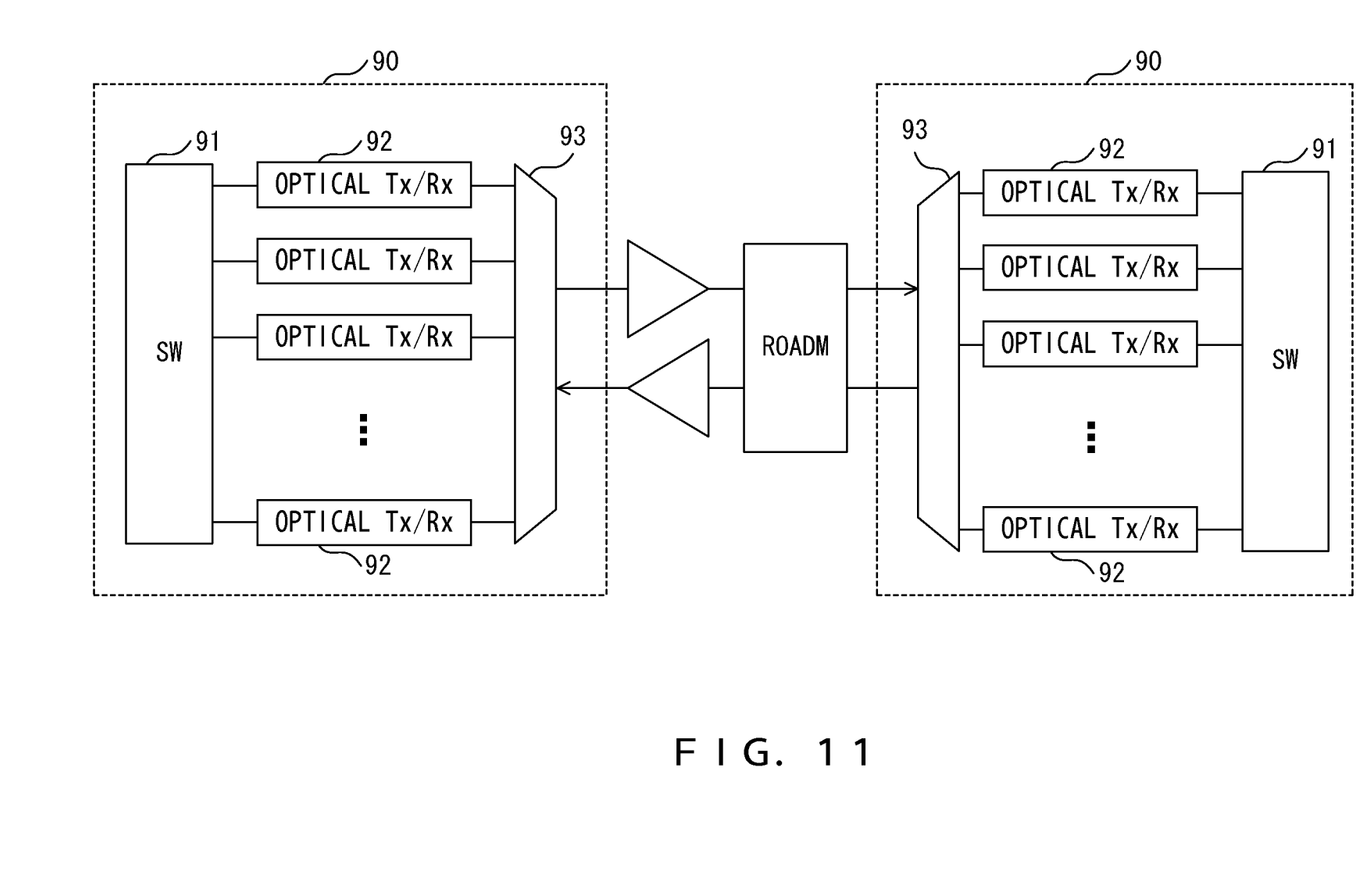
FIG. 11 illustrates an example of an optical transmission system using the optical transmission equipment according to the embodiment.

FIG. 11 illustrates an example of an optical transmission system using the optical transmission equipment according to the embodiment. In FIG. 11, the optical transmission equipment 90 is a WDM transmission equipment that transmits a WDM optical signal. The optical transmission equipment 90 includes a switch module 91, a plurality of optical transceiver circuits 92, and a multiplexer/demultiplexer 93.

The switch module 91 includes the switch circuit 83, the DSP 71, the E/O circuit array 72 and the O/E circuit array 79 similarly to the switch module 81 illustrated in FIG. 10. Each of optical transceiver circuit 92 includes, for example, the O/E circuit 13, the D/A converter 14, the optical transmitting device 15, the optical receiving device 16, the A/D converter 17 and the E/O circuit 18, which are illustrated in FIG. 3A. Alternatively, the plurality of optical transceiver circuits 92 may be realized by the optical transceiver modules 82 illustrated in FIG. 10. The multiplexer/demultiplexer 93 multiplexes modulated optical signals generated by the optical transceiver circuits 92, and transmits the multiplexed optical signal to an optical fiber transmission line. Moreover, the multiplexer/demultiplexer 93 demultiplexes a WDM optical signal received via an optical fiber transmission line with respect to wavelength, and guides each received modulated optical signal to a corresponding optical transceiver circuit 92.

On an optical fiber transmission line, an optical amplifier that amplifies a WDM optical signal may be provided. Moreover, on the optical fiber transmission line, Reconfigurable Optical Add Drop Multiplexer (ROADM) may be provided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical receiver, comprising:
    an optical receiving circuit configured to generate an analog received signal that represents a received modulated optical signal;
    an analog-to-digital (A/D) converter configured to generate a digital received signal from the analog received signal;
    an electrical-to-optical (E/O) circuit configured to generate an optical digital signal from the digital received signal;
    an optical-to-electrical (O/E) circuit configured to generate an electric digital signal from the optical digital signal; and
    a digital signal processor configured to recover a data signal from the electric digital signal.

2. The optical receiver according to claim 1, wherein
    the E/O circuit includes a multiplexer configured to generate a wavelength-multiplexed optical signal that represents the digital received signal as the optical digital signal, and
    the O/E circuit includes a demultiplexer configured to generate the electric digital signal from the wavelength-multiplexed optical signal.

3. The optical receiver according to claim 1, wherein
    the E/O circuit includes a multiplexer configured to generate a polarization-multiplexed optical signal that represents the digital received signal as the optical digital signal, and
    the O/E circuit includes a demultiplexer configured to generate the electric digital signal from the polarization-multiplexed optical signal.

4. The optical receiver according to claim 1, wherein
    the E/O circuit includes a modulation circuit configured to generate a multilevel-modulated optical signal that represents the digital received signal as the optical digital signal, and
    the O/E circuit includes a demodulation circuit configured to generate the electric digital signal from the multilevel-modulated optical signal.

5. An optical transmitter, comprising:
    a digital signal processor configured to generate a transmission signal;
    an electrical-to-optical (E/O) circuit configured to generate an optical digital signal from the transmission signal;
    an optical-to-electrical (O/E) circuit configured to generate an electric digital signal from the optical digital signal;
    a digital-to-analog (D/A) converter configured to generate an analog transmission signal from the electric digital signal; and
    an optical transmitting circuit configured to generate a modulated optical signal based on the analog transmission signal.

6. The optical transmitter according to claim 5, wherein
    the E/O circuit includes a multiplexer configured to generate a wavelength-multiplexed optical signal that represents the transmission signal as the optical digital signal, and
    the O/E circuit includes a demultiplexer configured to generate the electric digital signal from the wavelength-multiplexed optical signal.

7. The optical transmitter according to claim 5, wherein
    the E/O circuit includes a multiplexer configured to generate a polarization-multiplexed optical signal that represents the transmission signal as the optical digital signal, and
    the O/E circuit includes a demultiplexer configured to generate the electric digital signal from the polarization-multiplexed optical signal.

8. The optical transmitter according to claim 5, wherein
    the E/O circuit includes a modulation circuit configured to generate a multilevel-modulated optical signal that represents the digital received signal as the optical digital signal, and
    the O/E circuit includes a demodulation circuit configured to generate the electric digital signal from the multilevel-modulated optical signal.

9. An optical transceiver, comprising:
    an optical receiving circuit configured to generate an analog received signal that represents a received modulated optical signal;
    an analog-to-digital (A/D) converter configured to generate a digital received signal from the analog received signal;
    a first electrical-to-optical (E/O) circuit configured to generate a first optical digital signal from the digital received signal;
    a first optical-to-electrical (O/E) circuit configured to generate a first electric digital signal from the first optical digital signal;
    a digital signal processor configured to recover a data signal from the first electric digital signal, and to generate a transmission signal;
    a second electrical-to-optical (E/O) circuit configured to generate a second optical digital signal from the transmission signal;

a second optical-to-electrical (O/E) circuit configured to generate a second electric digital signal from the second optical digital signal;

a digital-to-analog (D/A) converter configured to generate an analog transmission signal from the second electric digital signal; and an optical transmitting circuit configured to generate a modulated optical signal based on the analog transmission signal.

10. The optical transceiver according to claim 9, wherein the optical receiving circuit, the A/D converter, the first E/O circuit, the second O/E circuit, the D/A converter and the optical transmitting circuit are packaged within a module removable from a board on which the digital signal processor, the first O/E circuit and the second E/O circuit are implemented.

11. An optical transceiver, comprising:

an optical receiving circuit configured to generate a plurality of analog received signals that respectively represent a plurality of received modulated optical signals;

an analog-to-digital (A/D) converter circuit configured to generate a plurality of digital received signals respectively from the plurality of analog received signals;

a digital signal processor configured to regenerate data signals respectively from the plurality of digital received signals, and to generate a plurality of transmission signals;

a digital-to-analog (D/A) converter circuit configured to generate a plurality of analog transmission signals respectively from the plurality of transmission signals;

an optical transmitting circuit configured to generate a plurality of modulated optical signals respectively based on the plurality of analog transmission signals;

a first optical circuit configured to respectively convert the plurality of digital received signals into first optical signals and transmit the first optical signals from the A/D converter circuit to the digital signal processor; and a second optical circuit configured to respectively convert the plurality of transmission signals into second optical signals and transmit the second optical signals from the digital signal processor to the D/A converter circuit.

12. An optical transmission equipment including a switch module and an optical transceiver module, the optical transmission equipment comprising:

a switch circuit configured to control a destination of a data signal;

an optical receiving circuit configured to generate an analog received signal that represents a received modulated optical signal;

an analog-to-digital (A/D) converter configured go generate a digital received signal from the analog received signal;

a digital signal processor configured to recover a data signal from the digital received signal and guide the recovered data signal to the switch circuit, and to generate a transmission signal from a data signal received from the switch circuit;

a digital-to-analog (D/A) converter configured to generate an analog transmission signal from the transmission signal;

an optical transmitting circuit configured to generate a modulated optical signal based on the analog transmission signal;

a first optical circuit configured to convert the digital received signal into a first optical signal and transmit the first optical signal from the A/D converter to the digital signal processor; and a second optical circuit configured to convert the transmission signal into a second optical signal and transmit the second optical signal from the digital signal processor to the D/A converter, wherein the switch circuit and the digital signal processor are packaged within the switch module, and the optical receiving circuit, the A/D converter, the D/A converter and the optical transmitting circuit are packaged within the optical transceiver module.

* * * * *